US006761987B2

(12) United States Patent
Marvin et al.

(10) Patent No.: US 6,761,987 B2
(45) Date of Patent: Jul. 13, 2004

(54) FUEL CELL SYSTEM HAVING AN ENERGY SOURCE BACKUP

(75) Inventors: Russel H. Marvin, Goshen, CT (US); James F. McElroy, Suffield, CT (US)

(73) Assignee: Plug Power Inc., Latham, NY (US)

( * ) Notice: Subject to any disclaimer, the term of this patent is extended or adjusted under 35 U.S.C. 154(b) by 552 days.

(21) Appl. No.: 09/823,263

(22) Filed: Mar. 30, 2001

(65) Prior Publication Data

US 2002/0021109 A1 Feb. 21, 2002

Related U.S. Application Data

(60) Provisional application No. 60/219,325, filed on Mar. 31, 2000.

(51) Int. Cl.[7] .............................................. H01M 8/04
(52) U.S. Cl. .............................. 429/13; 429/22; 429/23
(58) Field of Search .............................. 429/12, 13, 22, 429/23, 7, 9, 20; 320/134, 101; 361/62, 111; 307/64, 31, 29, 66

(56) References Cited

U.S. PATENT DOCUMENTS

| 4,741,978 A | * | 5/1988 | Takabayashi ................. 429/23 |
| 6,428,917 B1 | * | 8/2002 | Lacy et al. ................... 429/13 |
| 6,581,015 B2 | * | 6/2003 | Jones et al. ................... 702/60 |
| 2002/0001745 A1 | * | 1/2002 | Gartstein et al. ............. 429/61 |

* cited by examiner

Primary Examiner—Bruce F. Bell
Assistant Examiner—Monique Wills
(74) Attorney, Agent, or Firm—Trop, Pruner & Hu, P.C.

(57) ABSTRACT

A fuel cell includes a fuel cell subsystem, a battery and a circuit. The fuel cell subsystem is adapted to furnish power to a load. The circuit is adapted to connect the battery to the load when the fuel cell subsystem substantially delays in responding to a change in the power.

16 Claims, 4 Drawing Sheets

FUEL CELL SYSTEM HAVING AN ENERGY SOURCE BACKUP

This application claims the benefit under 35 U.S.C § 119(e) to U.S Provisional Patent Application Ser. No. 60/219,325, having a filing date of Mar. 31, 2000.

BACKGROUND

The invention relates to a fuel cell system that has an energy source backup.

A fuel cell is an electrochemical device that converts chemical energy produced by a reaction directly into electrical energy. For example, one type of fuel cell includes a proton exchange membrane (PEM), often called a polymer electrolyte membrane, that permits only protons to pass between an anode and a cathode of the fuel cell. At the anode, diatomic hydrogen (a fuel) is reacted to produce hydrogen protons that pass through the PEM. The electrons produced by this reaction travel through circuitry that is external to the fuel cell to form an electrical current. At the cathode, oxygen is reduced and reacts with the hydrogen protons to form water. The anodic and cathodic reactions are described by the following equations:

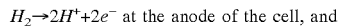
$H_2 \rightarrow 2H^+ + 2e^-$ at the anode of the cell, and

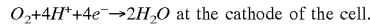
$O_2 + 4H^+ + 4e^- \rightarrow 2H_2O$ at the cathode of the cell.

A typical fuel cell has a terminal voltage near one volt DC. For purposes of producing much larger voltages, several fuel cells may be assembled together to form an arrangement called a fuel cell stack, an arrangement in which the fuel cells are electrically coupled together in series to form a larger DC voltage (a voltage near 100 volts DC, for example) and to provide a larger amount of power.

The fuel cell stack may include flow plates (graphite composite or metal plates, as examples) that are stacked one on top of the other, and each plate may be associated with more than one fuel cell of the stack. The plates may include various surface flow channels and orifices to, as examples, route the reactants and products through the fuel cell stack. Several PEMs (each one being associated with a particular fuel cell) may be dispersed throughout the stack between the anodes and cathodes of the different fuel cells.

The fuel cell stack may be part of a fuel cell stack system that supplies electrical power to an electrical load. For example, for a residential fuel cell system, the electrical load may be established by the various power consuming devices of a house. To furnish AC power to the house, the fuel cell system typically converts the DC voltage that is provided by the fuel cell stack into AC voltages.

Because the power that is demanded by the devices of the house may vary, the fuel cell system may control the rate at which the above-described electrochemical reactions occur for purposes of regulating the efficiency of the fuel cell stack. In this manner, the fuel cell system may include a fuel processor to convert a hydrocarbon (natural gas or propane, as examples) into a reformate that contains the hydrogen gas. The rate at which the fuel processor produces the hydrogen gas flow needs to be large enough to satisfy the stoichiometry that is dictated by the above-described equation. A larger power demand from the house typically requires a larger flow rate and thus, requires a higher rate of hydrogen production by the fuel processor.

A conventional fuel processor may have a relatively slow transient response that causes any increase in its rate of hydrogen production to significantly lag the increased demand for power. As a result, when the power that is demanded by the house suddenly increases, the cell voltages of the fuel cell stack may significantly decrease due to the lack of a sufficient hydrogen gas flow until the rate of hydrogen production by the fuel processor increases to the appropriate level. Due to the delayed response of the fuel processor, it is possible that the fuel cell stack may be damaged. For example, if an electrical load is placed on a fuel cell that is not adequately supplied with hydrogen, the cell can go from generating power to itself being an electrical load as water at the anode is electrolyzed to supply the protons passing through the membrane. In such a case, a negative voltage arises across the cell (the cell "goes negative"). This mode of operation in fuel cells has been known to irreparably damage the performance of such cells. Yet another problem arising from such a scenario is that the fuel cell is temporarily unable to meet the transient power demand.

Thus, there is a continuing need for an arrangement that addresses one or more of the problems that are stated above.

SUMMARY

In an embodiment of the invention, a fuel cell includes a fuel cell subsystem, a battery and a circuit. The fuel cell subsystem is adapted to furnish power to a load. The circuit is adapted to connect the battery to the load when the fuel cell subsystem substantially delays in responding to a change in the power.

Advantages and other features of the invention will become apparent from the following description, from the drawing and from the claims.

DETAILED DESCRIPTION

Figure 1:
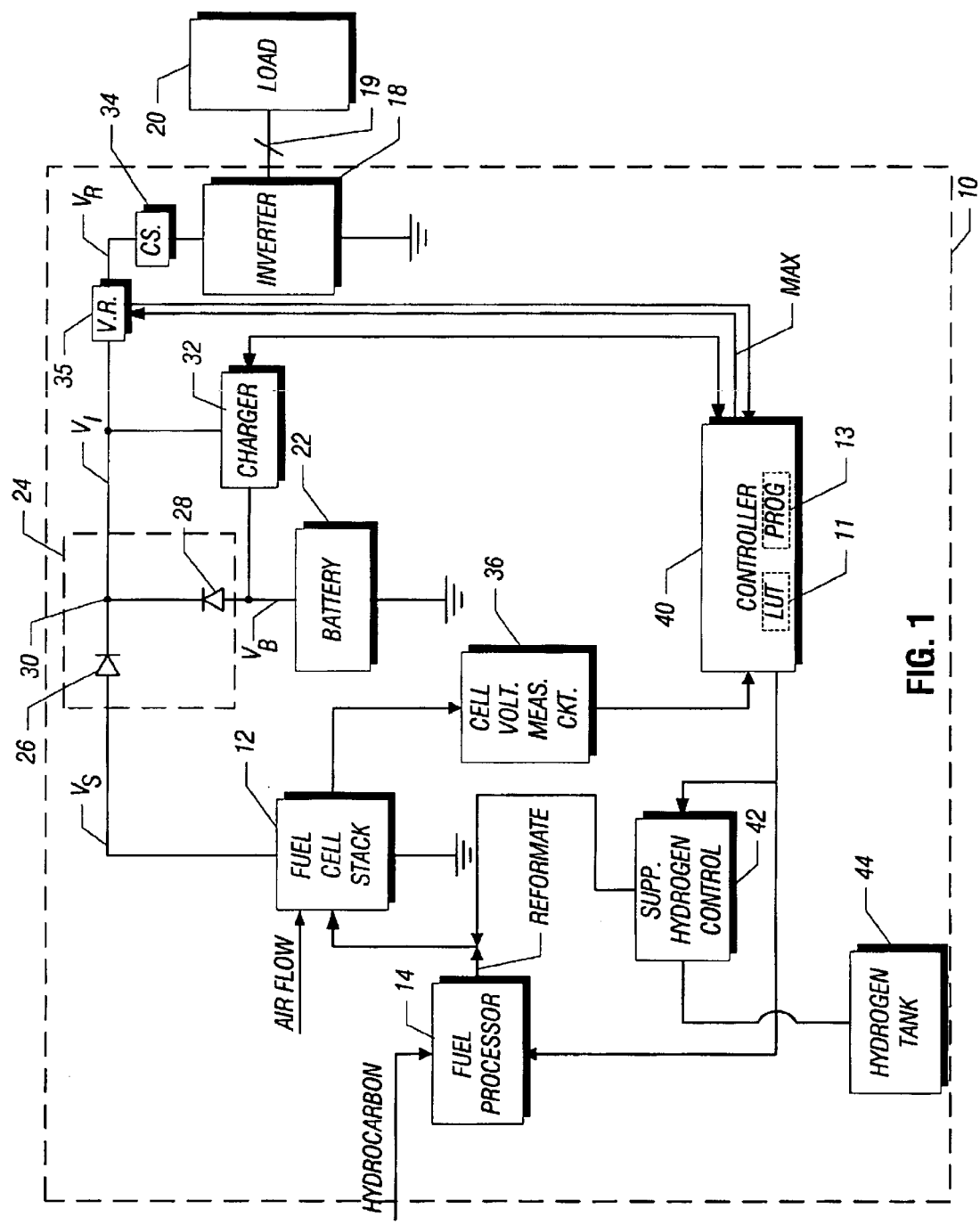
FIG. 1 is a schematic diagram of a fuel cell system according to an embodiment of the invention.

Referring to FIG. 1, an embodiment 10 of a fuel cell system in accordance with the invention includes a fuel cell stack 12 that consumes reactants (oxygen and hydrogen) to produce power for a load 20. As an example, the fuel cell system 10 may be a residential fuel cell system that supplies power to a house. Thus, the load 20 may collectively represent the various power consuming devices of a house that are currently consuming power from the fuel cell system 10. The power that is demanded by the house may vary over time and introduce power transients that may affect operation of the fuel cell stack 12, as described below.

To regulate the fuel cell stack 12 for purposes of responding to these transients, the system 10 includes a controller 40 that monitors the output power of the fuel cell system 10 and controls a fuel processor 14 (of the system 10) accordingly to regulate a rate at which the fuel processor 14 produces hydrogen gas containing reformate that is provided to the fuel cell stack 12. However, this control may not be adequate, as it is possible that the fuel processor 14 may have a relatively slow transient response. More specifically, when the power that is demanded by the load 20 increases suddenly, the fuel processor 14 may not respond quickly enough to prevent the fuel cells of the stack 12 from receiving a sufficient hydrogen gas flow. The deprivation of an adequate hydrogen gas flow, in turn, may cause the voltages of the fuel cells of the stack 12 to decrease to unacceptable levels, if not for the features of the fuel cell system 10 that are described below.

More particularly, the fuel cell stack 12 produces a terminal voltage (called $V_s$) that is the algebraic sum of all of the cell voltages of the stack 12. During the times when a transient does not occur, a voltage (called $V_I$) that is received by a voltage regulator 35 is approximately equal to the $V_s$ voltage. The voltage regulator 35 uses the $V_I$ voltage to produce a regulated DC voltage (called $V_R$). An inverter 18, in turn, converts the $V_R$ voltage into AC voltages that are furnished to (via electrical lines 20) the load 20.

Figure 4:
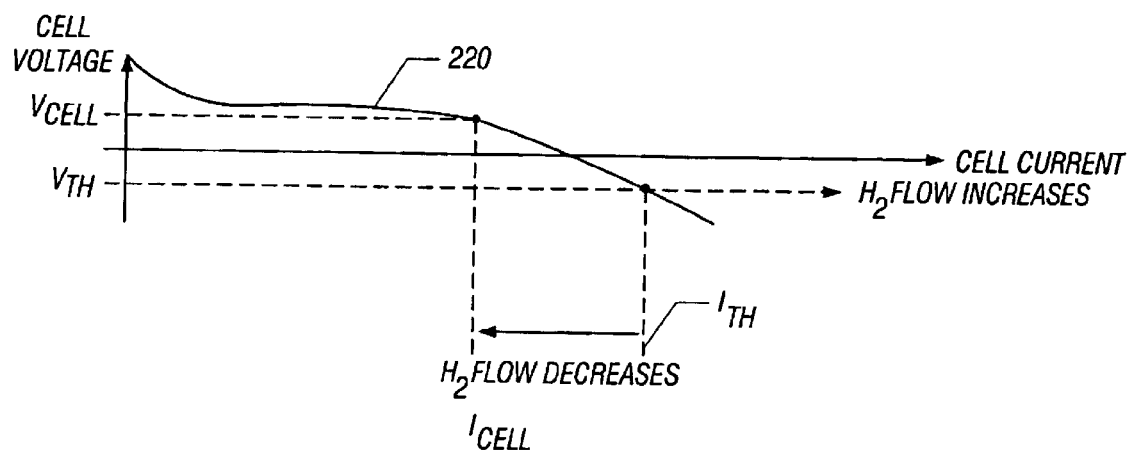
FIG. 4 illustrates a cell voltage versus current characteristic.

Because the fuel cells of the stack 12 are electrically coupled together in series, the cells have the same current. In this manner, each fuel cell may be characterized by a cell voltage versus cell current plot, called a polarization curve, such as an exemplary polarization curve 220 that is depicted in FIG. 4. As shown, the terminal voltage of the cell generally decreases with an increasing cell current. An exemplary operating point of the fuel cell is depicted in FIG. 4, an operating point at which the cell has a terminal voltage called $V_{CELL}$ and a current called $I_{CELL}$. The $V_{CELL}$ voltage is above a threshold voltage called $V_{TH}$ (−0.35 to −0.5 volts, for example) that approximately defines a breakpoint between a healthy fuel cell and an unhealthy fuel cell.

For example, contrary to what was previously believed (that a cell going negative to any extent would damage the cell), it was determined that for a fuel cell system with a Gore™ membrane electrode assembly utilizing between 13 and 130 standard liters per minute of reformate, fuel starving the system under an electrical load to produce a negative voltage up to −0.35 volts for 30 seconds produces no significant fuel cell damage. However, it is also noted that allowing the system to go negative to −0.5 volts will generally produce noticeable irreversible degradation. Thus, in this example −0.35 volts might be taken as $V_{TH}$. Alternatively, as an additional example the value might also be taken in the range of up to −0.5 volts. In this manner, the health, efficiency and general safety of the fuel cell stack 32 may suffer if one of the cell voltages decreases below the $V_{TH}$ voltage.

It is noted that the terminal voltage(s) of one or more of the fuel cells may go negative when a power transient occurs, as depicted in FIG. 4. However, it has been discovered that a negative cell voltage is acceptable as long as the cell voltage remains above $V_{TH}$, which, as an example, may be approximately −0.35 volts.

Referring back to FIG. 1, to keep each fuel cell voltage within an acceptable range, in some embodiments of the invention, the fuel cell system 10 includes an energy source, such as a battery 22, to supplement the power that is furnished by the fuel cell stack 12 when a power transient occurs. This supplemental power, in turn, reduces the power drain on the fuel cell stack 12 until the fuel processor 14 recovers from the power transient to produce the correct flow of reformate. As an example, in some embodiments of the invention, the battery 22 and fuel cell stack 12 are both coupled to a node 30 via a circuit 24 that includes diodes 26 and 28. The circuit 24 selectively switches the battery 22 and the fuel cell stack 12 to the node 30 to keep the $V_s$ voltage within a predefined range. In this manner, the diode 28 has its anode coupled to the positive terminal of the battery 22, and the cathode of the diode 28 is coupled to the node 30.

The anode of the diode 26 is coupled to positive terminal of the fuel cell stack 12. The cathode of the diode 26 is coupled to the node 30. The node 30 furnishes the $V_I$ voltage.

Figure 2:
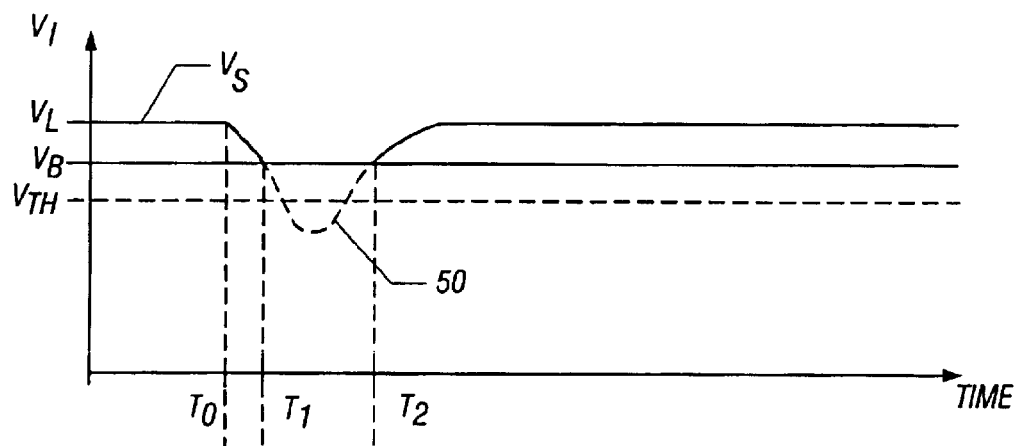
FIGS. 2 and 3 illustrate voltages of the fuel cell system according to an embodiment of the invention.

Referring also to FIG. 2, due to this arrangement, the battery 22 keeps the $V_s$ stack voltage from decreasing below a predefined voltage level (called $V_{TH}$). For example, at time $T_0$, the $V_s$ voltage may be near a voltage level (called $V_L$), the normal voltage level when a power transient has recently occurred. For this voltage level, the diode 26 conducts to couple the node 30 to the positive terminal of the fuel cell stack 12. However, at the $V_L$ voltage level, the diode 28 does not conduct and isolates the battery 22 from the node 30. At time $T_0$, a power transient may occur and cause the $V_s$ voltage to decrease due to the finite response time of the fuel processor 14, as depicted in FIG. 2. As shown, near time $T_1$, the $V_s$ voltage approaches a voltage called $V_B$, the terminal voltage of the battery 22. When the $V_s$ and $V_B$ voltages are approximately equal (such as at time $T_1$), both the diodes 26 and 28 conduct so that the battery 22 and the fuel cell stack 12 are both furnishing current to the node 30.

Figure 3:
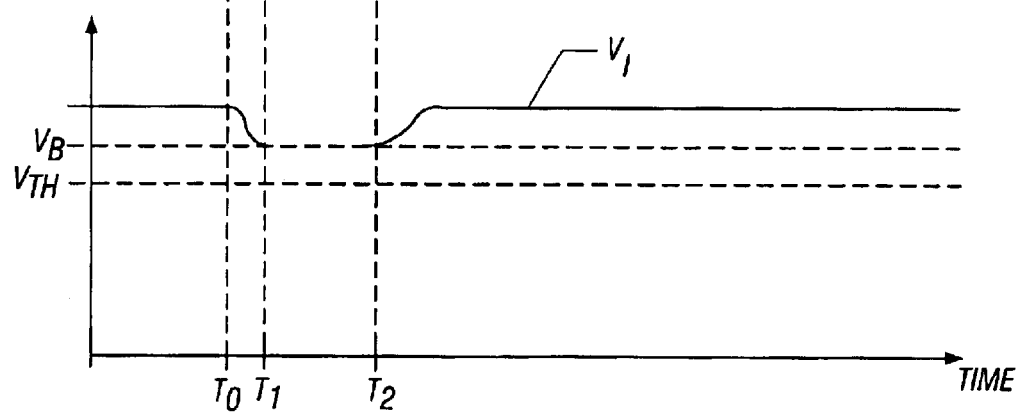

Referring also to FIG. 3, for this example, the transient lasts until time $T_2$, the time at which the fuel processor 14 recovers to produce a sufficient level of reformate, and due to this recovery, the $V_s$ voltage rises above the $V_B$ voltage. During times $T_1$ to $T_2$, the $V_s$ voltage may tend to further decrease, as depicted by the curve 50, if not for the circuit 24 (see FIG. 1). In this manner, the diode 26 does not conduct between times $T_1$ to $T_2$ to keep the $V_s$ voltage form decreasing below the $V_B$ voltage level. However, the diode 28 conducts during the $T_1$ to $T_2$ time interval to keep the $V_I$ voltage limited to the $V_B$ voltage, as depicted in FIG. 3.

Thus, the circuit 24 and the battery 22 perform at least two functions. First, this arrangement keeps the $V_s$ voltage (i.e., the terminal voltage of the of the fuel cell stack 12) from decreasing below the $V_{TH}$ voltage level, a voltage level at which some of the fuel cell voltages may decrease below an acceptable voltage. Secondly, this arrangement places a minimum voltage limit on the $V_I$ voltage so that the voltage regulator 35 is able to maintain regulation of the $V_R$ voltage.

When the battery 22 is not connected to the node 33, in some embodiments of the invention, the controller 40 activates a charger 32 (that is coupled to the terminals of the battery 22) to charge the battery 22. The controller 40 may base activation of the charger 22 on a monitored stack voltage that is provided by a cell voltage measuring circuit 36.

Referring to FIG. 1, besides the circuit 24 and the battery 22, the fuel cell system 10 may have additional features to limit the cell voltages. For example, in some embodiments of the invention, the controller 40 places a maximum limit on the cell current to keep the minimum cell voltage (among all of the cell voltages of the fuel cell stack 12) from decreasing below the $V_{TH}$ threshold voltage. The controller's choice of the maximum current limit may not be static, but rather, the choice of the maximum current limit may depend on other parameters, such as the minimum cell voltage, as described below.

In this manner, the polarization curve 220 that is depicted in FIG. 4 is for a particular hydrogen flow. As an example, for this given hydrogen flow, the controller 40 may set the maximum current limit near $I_{TH}$, the current level at the $V_{TH}$ threshold voltage. However, the polarization curve for a given fuel cell is not static, but rather, changes in the hydrogen flow cause the polarization curve for a given fuel cell to generally translate, or shift, along the current axis of the polarization curve. Using the polarization curve 220 as an example, an increase in the hydrogen flow shifts the curve 220 in a positive direction along the cell current axis to generally increase the level of the $I_{TH}$ threshold current level. A decrease in the hydrogen flow shifts the curve 220 in a negative direction along the cell current axis to generally decrease the level of the $I_{TH}$ threshold current level. Thus, an increase in the hydrogen flow generally causes the controller 40 to increase the maximum cell current limit, and a decrease in the hydrogen flow generally causes the controller 40 to decrease the maximum cell current limit.

To accomplish the above-described current limiting, in some embodiments of the invention, the controller 40 sets a maximum current limit of the voltage regulator 35 (see FIG. 1) of the fuel cell system 10. In this manner, for purposes of setting the maximum current limit, the controller 40 furnishes a signal (called MAX) that may be, for example, a current or voltage signal that is received by the regulator 35 and indicates the maximum cell current limit. In this manner, the MAX signal is used to set the maximum output current of the regulator 35, thereby establishing the maximum limit on the cell current.

The above-described control loop prevents the cells of the fuel cell stack 12 from "starving"0 from a lack of a sufficient hydrogen flow due to an increase in the power that is demanded by the load. In this manner, the maximum limit that is placed on the cell current accommodates the transient response of the fuel processor 14 and allows time for the fuel processor 14 to "catch up" in its production of reformate. As the fuel processor 14 increases the production reformate in response to an increase in the power demand, the controller 14 may increase the maximum current limit. Thus, the fuel cell system 10 has at least two control loops: a first quick response control loop to limit sudden changes in the output power, an event that may "starve" the cells of fuel cell stack 12 due to the relatively slow response of the fuel processor 14; and a second possibly slower control loop to control the fuel processor 14 to regulate the hydrogen flow into the fuel cell stack 12.

As described above, the controller 40 may at least partially base the maximum current limit on the minimum cell voltage. For purposes of monitoring the cell voltages and determining the minimum cell voltage, the controller 40 may use the voltage monitoring circuit 36. The voltage monitoring circuit 36 is coupled to the fuel cell stack 12 to continually measures the cell voltages and to also provide indications of the measured cell voltages to the controller 40. Either the voltage monitoring circuit 36 or the controller 40 (depending on the particular embodiment) may determine the minimum cell voltage, a voltage that the controller 40 uses to regulate the power output of the fuel cell system 10.

Figure 5:
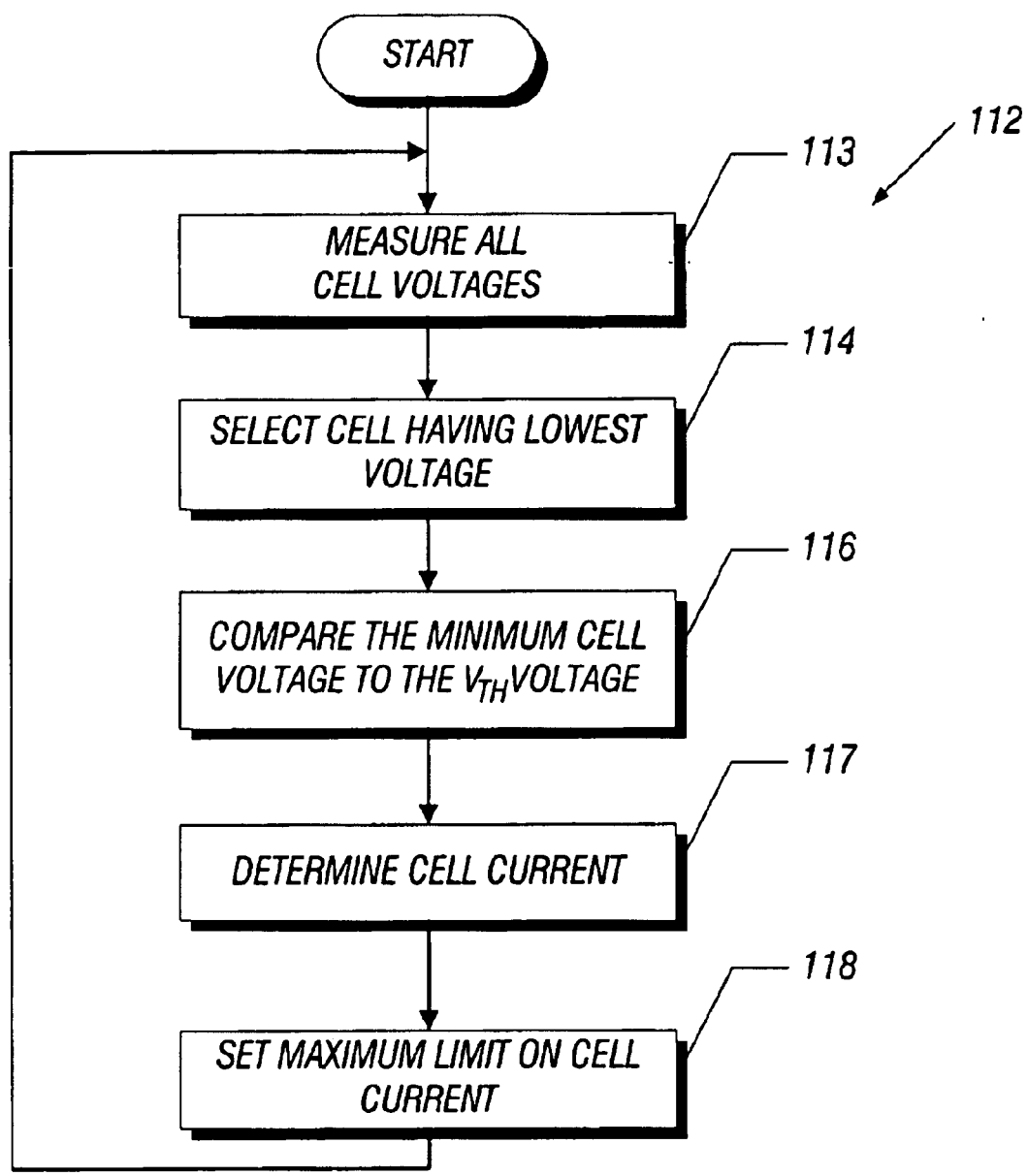
FIG. 5 is a flow diagram depicting control of the stack current according to an embodiment of the invention.

In this manner, the controller 40 may execute a program 13 (stored in a read only memory (ROM) of the controller 40, for example) that causes the controller 40 to perform a technique 112 that is depicted in FIG. 5. In accordance with this technique, the controller 40 uses the voltage monitoring circuit 36 to measure (block 113 of FIG. 5) all of the cell voltages of the fuel cell stack 12. From this information, the program 13 may also cause the controller 40 to select (block 114) the cell that has the minimum voltage, compare (block 116) the minimum cell voltage to the $V_{TH}$ threshold voltage, determine (block 117) the cell current (via a current sensor 34 (see FIG. 1), for example) and set (block 118) the cell current limit based on these factors. In some embodiments, the controller 40 may not use the cell current as a factor when setting the maximum current limit, and in some embodiments, the controller 40 may periodically retrieve indications of the measured voltages and/or an indication of the lowest cell voltage from the voltage monitoring circuit 36.

In some embodiments, the controller 40 regulates the minimum cell voltage to keep this voltage within an error band of voltages about a setpoint voltage, a voltage near the minimum threshold voltage. In the course of this regulation, when the minimum cell voltage becomes high enough to rise above the error band, the controller 40 increases the current limit. Conversely, when the lowest cell voltage becomes low enough to decrease below the error band, the controller 40 decreases the current limit.

When changing the current limit, in some embodiments of the invention, the controller 40 may adjust the current limit by an incremental amount that is a predetermined percentage (five percent, for example) of the maximum rated stack current. In other embodiments, the controller 40 may base the amount of change on other criteria or may base the change on a predetermined value.

In some embodiments, the controller 40 may use a proportional-integral-derivative (PID) control scheme, a heuristic control scheme or a look-up table (LUT) 11 (see FIG. 1) to perform the above-described dynamic current limiting. As examples, the LUT 11 may be stored in a read only memory (ROM) or a random access memory (RAM) of the fuel cell system 10, such as a memory of the controller 40. In some embodiments, the controller 40 may also be connected to a hydrogen sensor (not shown) in the anode exhaust. As an example, if the hydrogen concentration in the anode exhaust falls below a predetermined threshold (e.g., eight percent), the controller 40 can decrease the current limit. In this way, the hydrogen sensor can provide additional feedback to prevent the current draw on the stack 12 from starving the cells.

The cell voltages may vary over the lifetime and/or operating conditions of the fuel cell stack 12. Thus, over time, different cells may furnish the minimum cell voltage. However, because the controller 40 bases its control on the most recently determined minimum voltage cell, the control by the controller 40 accounts for this occurrence. Thus, in some embodiments, the controller 40 dynamically determines the minimum cell as voltage during the course of regulation.

The fuel cell system 10 may use other techniques to counteract a sudden change in demand for output power. For example, in some embodiments of the invention, the fuel cell system 10 includes a hydrogen tank 44 (see FIG. 1) that stores hydrogen to supplement the reformate flow from the fuel processor 14 to counteract transients. In this manner, the controller 40 may control a hydrogen control valve 42 to regulate the introduction of the hydrogen into the reformate flow that enters the stack 12.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A fuel cell system comprising:
   a fuel cell subsystem comprising a fuel cell stack adapted to furnish power to a load;
   a battery;
   a first circuit adapted to selectively connect the battery to the load and isolate the battery from the load based on a response of the fuel cell subsystem to a change in the power;
   a current sensor to indicate a current through the fuel cell stack; and a second circuit coupled to the current sensor to monitor cell voltages of the fuel cell stack, determine the minimum of the cell voltages and prevent the current from exceeding a maximum threshold current based on the minimum cell voltage.

2. The fuel cell system of claim 1, wherein the fuel cell subsystem comprises:

a fuel cell stack adapted to receive a hydrogen flow; and a fuel processor to produce the hydrogen flow.

3. The fuel cell system of claim 2, wherein the fuel cell subsystem further comprises:

a controller adapted to monitor the power and regulate a rate at which the fuel processor produces the hydrogen flow based on the monitored power.

4. The fuel cell system of claim 1, wherein the first circuit is further adapted to connect the battery to the load based on a fuel cell stack voltage of the fuel cell subsystem.

5. The fuel cell system of claim 1, wherein the first circuit comprises:

a first diode to couple the battery to the fuel cell subsystem when a stack voltage of the fuel cell subsystem is near a predefined threshold voltage.

6. The fuel cell system of claim 1, wherein the second circuit comprises:

a voltage regulator adapted to regulate a stack voltage of the fuel cell stack and limit the current through the stack.

7. A method comprising:

using a fuel cell stack to furnish power to a load;

selectively connecting a battery to the load and isolating the battery from the load based on a response of the fuel cell stack to a change in the power;

monitoring a current through the fuel cell stack;

monitoring cell voltages of the fuel cell stack;

determining the minimum of the cell voltages; and preventing the current from exceeding a maximum threshold current based on the minimum cell voltage.

8. The method of claim 7, further comprising:

monitoring the power;

producing hydrogen;

regulating a rate of the production in response to the monitoring; and providing the hydrogen to a fuel cell stack of the system.

9. A The method of claim 7, further comprising:

connecting the battery to the load based on a fuel cell stack voltage of the fuel cell subsystem.

10. The method of claim 7, further comprising:

connecting the battery to the load when a stack voltage of the fuel cell subsystem is near a predefined threshold voltage.

11. The method of claim 7, further comprising:

using a voltage regulator to regulate a stack voltage of the fuel cell stack and limit the current through the stack.

12. A fuel cell system comprising:

a fuel cell subsystem adapted to measure a lowest cell voltage and further adapted to furnish power to a load, wherein the fuel cell subsystem is connected to the load through a diode;

a fuel processor subsystem adapted to furnish reformate to the fuel cell subsystem; and a supplemental power subsystem adapted to furnish power to the load when the lowest cell voltage drops below a predefined threshold voltage, wherein the supplemental power subsystem is connected to the load through a diode a current sensor to indicate a current through a fuel cell stack of the fuel cell subsystem; and a circuit coupled to the current sensor to monitor cell voltages of said fuel cell stack, determine the minimum of the cell voltages and prevent the current from exceeding a maximum threshold current based on the minimum cell voltage.

13. A fuel cell system comprising:

a fuel cell subsystem adapted to measure a lowest cell voltage and further adapted to furnish power to a load, wherein the fuel cell subsystem is connected to the load through a diode;

a fuel processor subsystem adapted to furnish reformate to the fuel cell subsystem;

a supplemental power subsystem adapted to furnish power to the load when the lowest cell voltage drops below a predefined threshold voltage, wherein the supplemental power subsystem is connected to the load through a diode; and a controller adapted to monitor the power and regulate a rate at which the fuel processor produces the hydrogen flow based on the monitored power a current sensor to indicate a current through a fuel cell stack of the fuel cell subsystem; and a circuit coupled to the current sensor to monitor cell voltages of said fuel cell stack, determine the minimum of the cell voltages and prevent the current from exceeding a maximum threshold current based on the minimum cell voltage.

14. The fuel cell system of claim 13, further comprising:

a predefined threshold voltage of −0.35 volts.

15. The fuel cell system of claim 13, further comprising:

a predefined threshold voltage of more than −0.4 volts.

16. The fuel cell system of claim 13, further comprising:

a predefined threshold voltage of more than −0.5 volts.

* * * * *